US009855719B2

(12) United States Patent
Gastel

(10) Patent No.: US 9,855,719 B2
(45) Date of Patent: Jan. 2, 2018

(54) SHIM FOR INSERTION BETWEEN THE FACING SURFACES OF TWO PARTS

(71) Applicant: Daniel Andre Gastel, Plaisir les Gatines (FR)

(72) Inventor: Daniel Andre Gastel, Plaisir les Gatines (FR)

( * ) Notice: Subject to any disclaimer, the term of this patent is extended or adjusted under 35 U.S.C. 154(b) by 44 days.

(21) Appl. No.: 15/100,365

(22) PCT Filed: Dec. 2, 2014

(86) PCT No.: PCT/FR2014/053123
§ 371 (c)(1),
(2) Date: May 31, 2016

(87) PCT Pub. No.: WO2015/082826
PCT Pub. Date: Jun. 11, 2015

(65) Prior Publication Data
US 2016/0297166 A1    Oct. 13, 2016

(30) Foreign Application Priority Data

Dec. 6, 2013  (FR) ..................................... 13 62251

(51) Int. Cl.
| | |
|---|---|
| *B32B 3/18* | (2006.01) |
| *B32B 7/06* | (2006.01) |
| *B32B 7/12* | (2006.01) |
| *B32B 3/14* | (2006.01) |
| *B32B 3/26* | (2006.01) |
| *B32B 15/04* | (2006.01) |

(52) U.S. Cl.
CPC .................. *B32B 3/18* (2013.01); *B32B 3/14* (2013.01); *B32B 3/263* (2013.01); *B32B 3/266* (2013.01); *B32B 7/06* (2013.01); *B32B 7/12* (2013.01); *B32B 15/043* (2013.01); *B32B 2250/44* (2013.01)

(58) Field of Classification Search
CPC .................................. B32B 33/14; B32B 3/18
See application file for complete search history.

(56) References Cited

U.S. PATENT DOCUMENTS

| | | | | |
|---|---|---|---|---|
| 4,232,068 | A | * | 11/1980 | Hoh .............................. 428/167 |
| 4,793,482 | A | | 12/1988 | Workman |
| 5,853,838 | A | | 12/1998 | Siems et al. |
| 2005/0079782 | A1 | | 4/2005 | Gastel |

FOREIGN PATENT DOCUMENTS

EP    2 329 946 A1    6/2011

OTHER PUBLICATIONS

European Patent Office; International Search Report in International Patent Application No. PCT/FR2014/053123, (Apr. 1, 2015).

* cited by examiner

*Primary Examiner* — Adam Krupicka
(74) *Attorney, Agent, or Firm* — Leydig Voit and Mayer

(57) ABSTRACT

The invention relates to a shim for insertion between the facing surfaces of two parts, in which the separation between the parts is variable with position along the facing surfaces. The shim includes sections that are juxtaposed in a direction transverse to the separation, at least some of the sections are strippable shim sections that include a stack of sheets which are adhered to one another by an adhesive. Slits between individual strippable shim sections allow selective removal of sheets from respective sections, altering shim thickness with position along the facing surfaces.

9 Claims, 1 Drawing Sheet

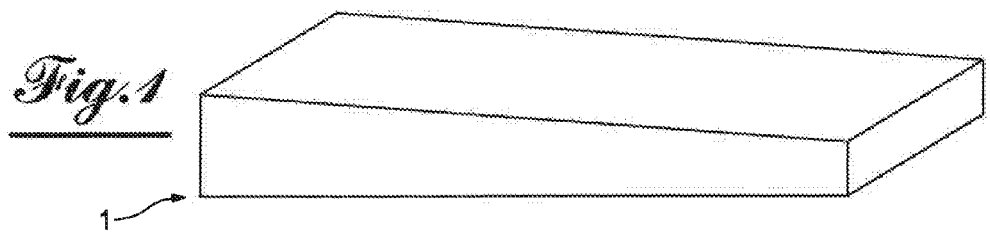
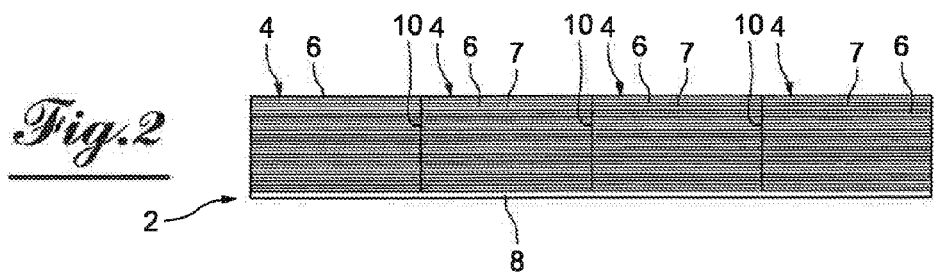
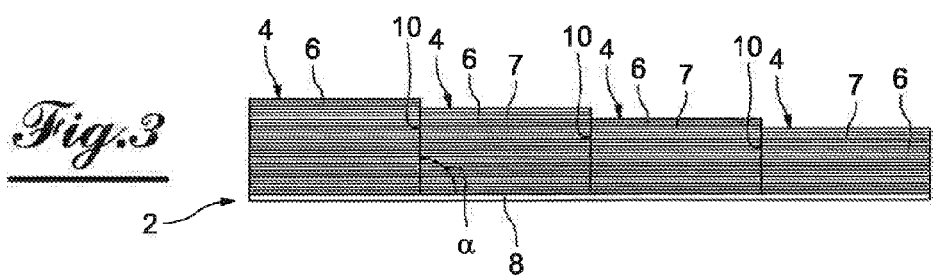
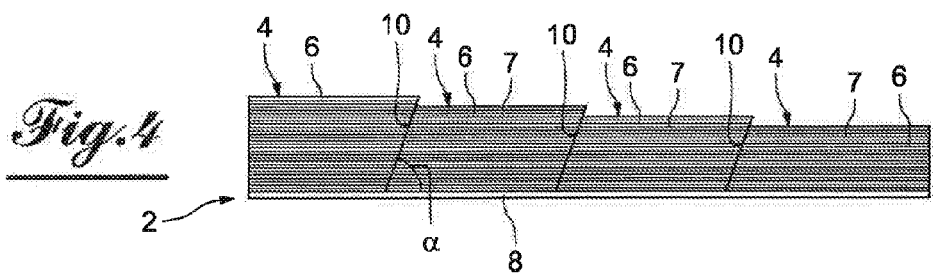
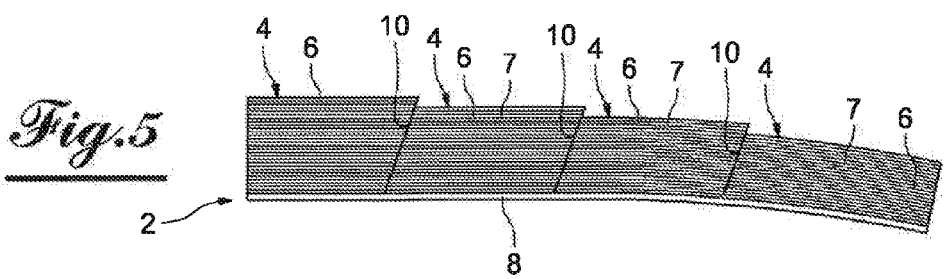

SHIM FOR INSERTION BETWEEN THE FACING SURFACES OF TWO PARTS

FIELD OF THE INVENTION

The invention relates to a shim for insertion between the facing surfaces of two parts, the separation of which is variable.

BACKGROUND

Shims of this type are known, which are specifically designed, during their manufacture, generally from metal, for each application scenario and therefore have an established shape once and for all, compatible with the space between the two parts.

The invention aims to offset this drawback.

SUMMARY OF THE INVENTION

To achieve this aim, the shim according to the invention is characterized in that it includes a plurality of sections that are juxtaposed in the direction in which the separation varies, at least some of which are strippable shim sections, formed by stacking a multitude of sheets that adhere to one another by insertion of an adhesive layer.

According to one feature of the invention, the shim is characterized in the two adjacent sections are separated by a slit formed in the thickness from the upper surface of the shim up to a predetermined depth.

According to another feature of the invention, the shim is characterized in that the slits are suitable for allowing the grasping, each time the upper sheet of the stack with section delimited by the slits is grasped to remove that sheet.

According to still another feature of the invention, the shim is characterized in that the slits are inclined relative to the juxtaposition direction of the sections, by a predetermined angle.

According to still another feature of the invention, the shim is characterized in that the incline angle is comprised between 90 and 30°, preferably between 90 and 45°.

According to still another feature of the invention, the shim is characterized in that the slits are done by milling.

According to still another feature of the invention, the shim is characterized in that the stacks of sheets of the sections are positioned on a shared base layer and in that the slits extend to that layer.

According to still another feature of the invention, the shim is characterized in that the sheets are made from a material such as metal, PET, carbon glass fabric.

According to still another feature of the invention, the shim is characterized in that the adhesive is a flexible glue such as a neoprene glue.

According to still another feature of the invention, the shim is characterized in that the sheets of a section stack have a thickness of approximately one tenth of a millimeter.

BRIEF DESCRIPTION OF DRAWING FIGURES

The invention will be better understood, and other aims, features, details and advantages thereof will appear more clearly, during the following explanatory description done in reference to the appended diagrammatic drawings, provided solely as an example illustrating one embodiment of the invention and in which:

FIG. 1 is a side view of a shim according to the state of the art, the height of which varies in the longitudinal direction;

FIG. 2 is a view of a first embodiment of a strippable shim according to the invention, before stripping;

FIG. 3 is a side view of the shim of FIG. 2, stripped to correspond to the shape of the shim of FIG. 1;

FIG. 4 shows another embodiment of a shim according to the invention in the state corresponding to FIG. 3;

FIG. 5 shows a shim according to FIG. 4, which is curved in its longitudinal direction.

DETAILED DESCRIPTION

FIG. 1 shows a shim 1 of the state of the art that is designed to be inserted between the facing surfaces of two parts, the separation of which varies gradually from one end to the other. This shim therefore has a thickness that varies gradually in a complementary manner in the direction of its length. The shim has been manufactured for this specific application and is therefore not usable for other applications.

The shims according to the invention offset this drawback.

As shown by the figures, their thickness is adaptable to insertion spaces between the surfaces of two parts, the separation of which varies. To that end, a shim according to the invention, denoted 2, comprises a plurality of sections 4 juxtaposed in the longitudinal direction of the shim and each of which constitutes a strippable shim formed by the stackable multitude of sheets 6 that adhere to one another by insertion of an adhesive layer 7. This adhesive makes it possible to keep the sheets assembled to one another while ensuring an adjustment of the height of the stack by stripping one or more sheets. Consequently, the cohesion strength of two adjacent sheets is greater than the maintenance value of the stack, but lower than the stripping force.

As shown in the figures, the different stacks of sheets 4 are juxtaposed on a continuous base layer 8 that therefore constitutes a shared base for all of the stacks.

The different stacks 6 are separated from one another by a slit 10 extending from the upper surface of the stacks to the base layer 8. The thickness of this slit is advantageously chosen to allow grasping of the sheets to be able to remove the upper sheet of a stack each time. This slit 10 can be oriented relative to the longitudinal direction of the shim by an angle α comprised between 90 and 30°, preferably between 90 and 45°. Owing to this incline, a stack can bear on the adjacent stack. The orientation of the slits in the direction of the width of the shim is advantageously, but not necessarily, perpendicular to the longitudinal direction.

As shown in FIG. 2, a shim according to the invention, provided with individually strippable sections, is advantageously obtained from a strippable shim including the stackable plurality of sheets extending over the entire length of the shim. The individual stacks 6 are next made by forming cuts from the upper surface of the shim to the base layer, for example by milling or according to any other known cutting method.

According to FIG. 5, the shim according to the invention can be curved. To that end, it is preferable for the separating slits 10 of the individual stacks 6 to be inclined in the indicated direction relative to the base layer 8. This incline has the advantage that it starts in the same direction as the curve.

The sheets may be made from any appropriate material, for example PET, glass or carbon fabric, and bonded to one another using any glues or resins, such as neoprene, epoxide, cyanate-ester. The thicknesses of the sheets will correspond to the required precision. They may for example have a thickness of one tenth of a millimeter.

Of course, various changes may be made to the invention as described and shown in figures. In the example described above, the stacks are juxtaposed in the longitudinal direction of the shim. It is also possible to provide stacks juxtaposed in the direction of the width. These stacks would then be separated by slits oriented accordingly. The invention, of course, also covers shims including stacks juxtaposed in the direction of the length and width.

The invention claimed is:

1. A shim for insertion between facing surfaces of two parts, wherein separation of the facing surfaces varies along the facing surfaces, the shim comprising:
    a plurality of sections, wherein
        the sections are juxtaposed in a juxtaposition direction that extends along the facing surfaces,
        at least some of the sections are individually strippable shim sections including a plurality of sheets adhered to one another, within each individually strippable shim section, by an adhesive layer, and
        two adjacent individually strippable shim sections are separated by a slit extending between the two adjacent individually strippable shim sections from upper surfaces of the two adjacent individually strippable shim sections.

2. The shim according to claim 1, including a plurality of slits, wherein
    each slit is located between a respective adjacent pair of individually strippable shim sections, and
    an upper sheet of each individually strippable shim section, between two of the slits, is removable.

3. The shim according to claim 2, wherein the slits are milled.

4. The shim according to claim 2, wherein the individually strippable shim sections are positioned on a shared base layer and the slits extend to the shared base layer.

5. The shim according to claim 2, wherein the slits are inclined relative to the juxtaposition direction.

6. The shim according to claim 5, wherein the slits are inclined at an angle in a range from 90° to 30°.

7. The shim according to claim 1, wherein the sheets are a material selected from the group consisting of a metal, PET, glass, and carbon fabric.

8. The shim according to claim 1, wherein the adhesive is flexible.

9. The shim according to claim 1, wherein the sheets have a thickness of approximately one-tenth of one millimeter.

* * * * *